United States Patent
Shin et al.

(10) Patent No.: US 10,609,563 B2
(45) Date of Patent: Mar. 31, 2020

(54) INFORMATION INSERT IN THREE DIMENSIONAL (3D) STRUCTURE AND NON-DESTRUCTIVE INFORMATION RECOGNITION METHOD

(71) Applicant: Korea Electronics Technology Institute, Seongnam-si, Gyeonggi-do (KR)

(72) Inventors: Choon Sung Shin, Seoul (KR); Sung Hee Hong, Seoul (KR); Ji Soo Hong, Seoul (KR); Young Min Kim, Seoul (KR); Hoon Jong Kang, Goyang-si (KR); Young Choong Park, Goyang-si (KR)

(73) Assignee: KOREA ELECTRONICS TECHNOLOGY INSTITUTE, Seongnam-si, Gyeonggi-Do (KR)

( * ) Notice: Subject to any disclaimer, the term of this patent is extended or adjusted under 35 U.S.C. 154(b) by 439 days.

(21) Appl. No.: 15/327,375

(22) PCT Filed: Jan. 22, 2016

(86) PCT No.: PCT/KR2016/000732
§ 371 (c)(1),
(2) Date: Jan. 18, 2017

(87) PCT Pub. No.: WO2017/051999
PCT Pub. Date: Mar. 30, 2017

(65) Prior Publication Data
US 2017/0311164 A1    Oct. 26, 2017

(30) Foreign Application Priority Data
Sep. 25, 2015  (KR) ......................... 10-2015-0136060

(51) Int. Cl.
*G06K 19/06*   (2006.01)
*H04W 12/12*   (2009.01)
(Continued)

(52) U.S. Cl.
CPC ............. *H04W 12/12* (2013.01); *B29C 67/00* (2013.01); *B33Y 50/02* (2014.12); *B33Y 80/00* (2014.12);
(Continued)

(58) Field of Classification Search
CPC ......... B29C 67/00; B33Y 50/02; B33Y 80/00; G01V 15/00; G06K 19/06159;
(Continued)

(56) References Cited

U.S. PATENT DOCUMENTS

| 4,903,069 A * | 2/1990 | Lam ....................... G03B 35/14 |
| | | 355/22 |
| 2007/0126138 A1 * | 6/2007 | Dooley ............... B29C 44/0415 |
| | | 264/46.4 |

(Continued)

OTHER PUBLICATIONS

Korean Office Action dated Nov. 14, 2016 in connection with the counterpart Korean Patent Application No. 10-2015-0136060.

*Primary Examiner* — Thien M Le
(74) *Attorney, Agent, or Firm* — Hauptman Ham, LLP

(57) ABSTRACT

A method for inserting information into a 3D structure and recognizing information in a non-destructive method is provided. A 3D printing method according to an exemplary embodiment of the present invention includes: generating a tag having specific information recorded thereon to be inserted into a 3D structure, and printing the tag on the inside of the 3D structure while printing the 3D structure. Accordingly, since the tag having information recorded thereon is (Continued)

printed on the inside of the 3D structure when the 3D structure is printed by a 3D printer, it is impossible to forge/falsify information.

6 Claims, 14 Drawing Sheets

(51) Int. Cl.
| | | |
|---|---|---|
| *B29C 67/00* | (2017.01) | |
| *B33Y 50/02* | (2015.01) | |
| *B33Y 80/00* | (2015.01) | |
| *G06K 19/14* | (2006.01) | |
| *G06K 19/10* | (2006.01) | |
| *G01V 15/00* | (2006.01) | |
| *G06K 9/00* | (2006.01) | |
| *H04W 12/06* | (2009.01) | |

(52) U.S. Cl.
CPC ....... *G06K 19/06159* (2013.01); *G06K 19/10* (2013.01); *G06K 19/14* (2013.01); *G01V 15/00* (2013.01); *G06K 9/0004* (2013.01); *G06K 2009/0059* (2013.01); *G06K 2019/06243* (2013.01); *H04W 12/06* (2013.01)

(58) Field of Classification Search
CPC ................... G06K 19/10; G06K 19/14; G06K 2019/06243; G06K 9/0004; H04W 12/06; H04W 12/12
See application file for complete search history.

(56) References Cited

U.S. PATENT DOCUMENTS

| | | | | |
|---|---|---|---|---|
| 2008/0252293 | A1* | 10/2008 | Lagae | G01S 7/411 324/318 |
| 2010/0215760 | A1* | 8/2010 | Kundu | A61K 9/5115 424/499 |
| 2010/0268138 | A1* | 10/2010 | Summit | A61F 5/013 602/16 |
| 2014/0039451 | A1* | 2/2014 | Bangera | G06F 17/5086 604/506 |
| 2015/0170013 | A1 | 6/2015 | Wilson et al. | |
| 2016/0067927 | A1* | 3/2016 | Voris | B33Y 50/02 700/98 |
| 2016/0174698 | A1* | 6/2016 | Huang | A46B 9/04 15/167.1 |
| 2017/0258526 | A1* | 9/2017 | Lang | H05K 999/99 |
| 2018/0253081 | A1* | 9/2018 | Jones | B29C 70/58 |
| 2018/0326665 | A1* | 11/2018 | Gatenholm | B01L 1/02 |

* cited by examiner

INFORMATION INSERT IN THREE DIMENSIONAL (3D) STRUCTURE AND NON-DESTRUCTIVE INFORMATION RECOGNITION METHOD

TECHNICAL FIELD

The present invention relates to information recognition technology, and more particularly, to a method and a system for giving information on a 3D structure and recognizing the given information.

BACKGROUND ART

The utilization and scope of 3D printers, which were initially developed in the 1980s, is increasing steeply to such an extent that their popular models are released for use in households.

Accordingly, various sculptures may be produced utilizing 3D printers. In addition to sculptures created by the human hand, sculptures produced through 3D printers have creativity and thus should be protected as works.

Preventing a reproduction is an ultimate means for protecting works, but it should be premised on the presence of a means for distinguishing original works. In addition, this means should not be maliciously damaged.

IT technology may be incorporated into authentication of originals. For example, a bar code or an RFID tag may be attached to an original. However, there is a problem that reliability is not guaranteed since it is easy to forge or falsify the bar code or the RFID tag.

DISCLOSURE

Technical Problem

The present invention has been developed in order to address the above-discussed deficiencies of the prior art, and an object of the present invention is to provide a 3D printing method which, when printing a 3D structure using a 3D printer can print a tag having specific information recorded thereon on the inside of the 3D structure, and a method for recognizing information using the same.

Technical Solution

According to an exemplary embodiment of the present invention to achieve the above-described object, a 3D printing method includes: generating a tag having specific information recorded thereon to be inserted into a 3D structure; and printing the tag on the inside of the 3D structure while printing the 3D structure.

In addition, the specific information may be information on the 3D structure.

In addition, according to an exemplary embodiment of the present invention, the 3D printing method may further include: sensing a shape of the tag using electromagnetic waves having semi-permeability without destroying the 3D structure; and extracting the specific information from the sensed shape of the tag.

In addition, according to an exemplary embodiment of the present invention, the 3D printing method may further include determining a location of the tag based on the shape of the 3D structure.

In addition, 2D cross sections including the center of the tag may be the same.

In addition, the tag may be a code in which spherical patterns are combined with one another.

In addition, each of the spherical patterns of the tag may be one of a first material and a second material.

According to another exemplary embodiment of the present invention, a 3D printer structure includes: a 3D structure which is produced by a 3D printer; and a tag which is formed on the inside of the 3D structure by the 3D printer and has specific information recorded thereon.

Advantageous Effects

According to exemplary embodiments of the present invention as described above, since the tag having information recorded thereon is printed on the inside of the 3D structure when the 3D structure is printed by the 3D printer, it is impossible to forge/falsify information.

In addition, according to exemplary embodiments of the present invention, the information recorded on the tag printed on the inside of the 3D structure can be recognized without deforming or destroying the 3D structure, and the information of the inside of the 3D structure can be recognized when the tag is accessed in any direction.

Furthermore, according to exemplary embodiments of the present invention, the tag can be recognized equally in all directions and the rate of recognition is also high.

In addition, according to exemplary embodiments of the present invention, various types of tags to be inserted into the 3D structure may be implemented, and the tag can be recognized automatically and rapidly and the information can be recognized even when the location and type of the tag are not known in advance.

BEST MODE

Hereinafter, the present invention will be described in more detail with reference to the accompanying drawings.

Figure 1:
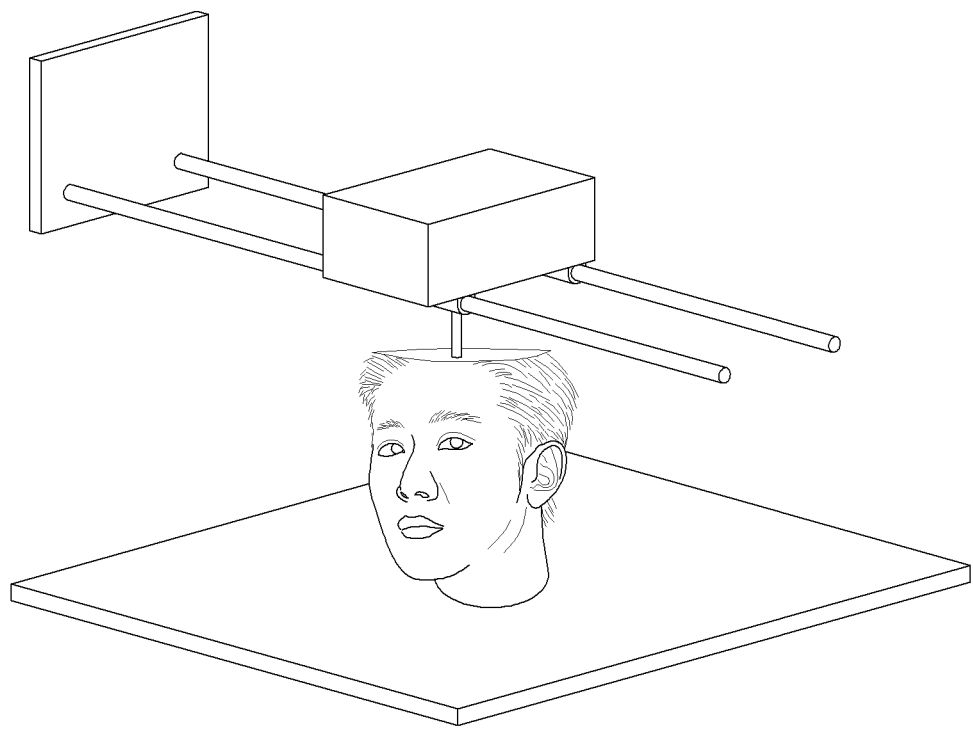
FIG. 1 is an image showing a situation in which a 3D structure is printed using a 3D printer.

FIG. 1 is an image showing a situation in which a 3D structure is printed using a 3D printer. In a 3D printing method according to an exemplary embodiment of the present invention, when a 3D structure is printed by a 3D printer, a tag is also printed on the inside of the 3D structure.

Figure 2:
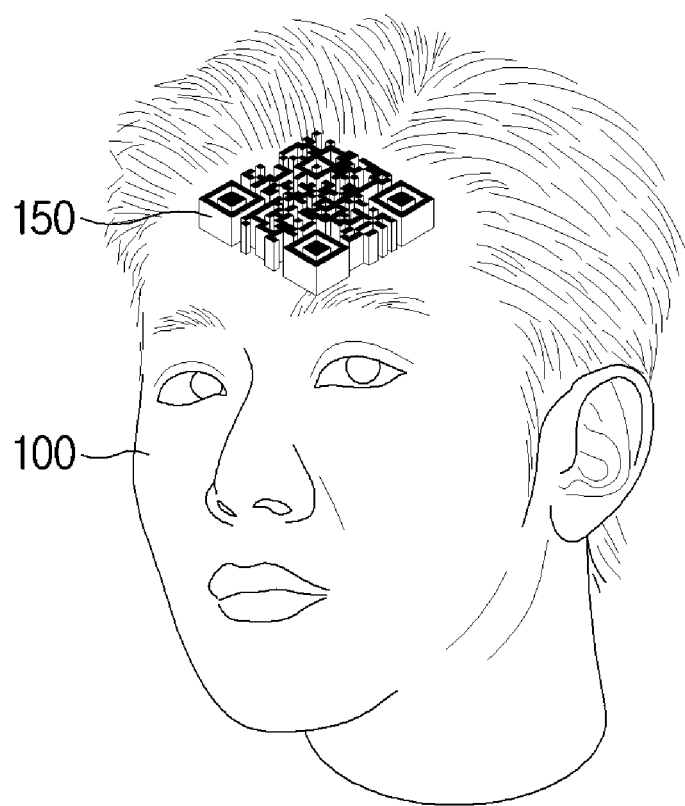
FIG. 2 is a view conceptually showing a tag which is printed on the inside of the 3D structure.

FIG. 2 is a view conceptually showing a tag 150 which is printed on the inside of a 3D structure 100 which is printed by a 3D printer. The tag 150 has specific information recorded thereon. Specifically, the tag 150 may have meta information and information on the 3D structure 100 recorded thereon. Herein, the information may include a material, a purpose, a using method, a price, a manufacturer, a manufacturing date, a manufacturing place, copyright information, and an original authentication code.

Figure 3:
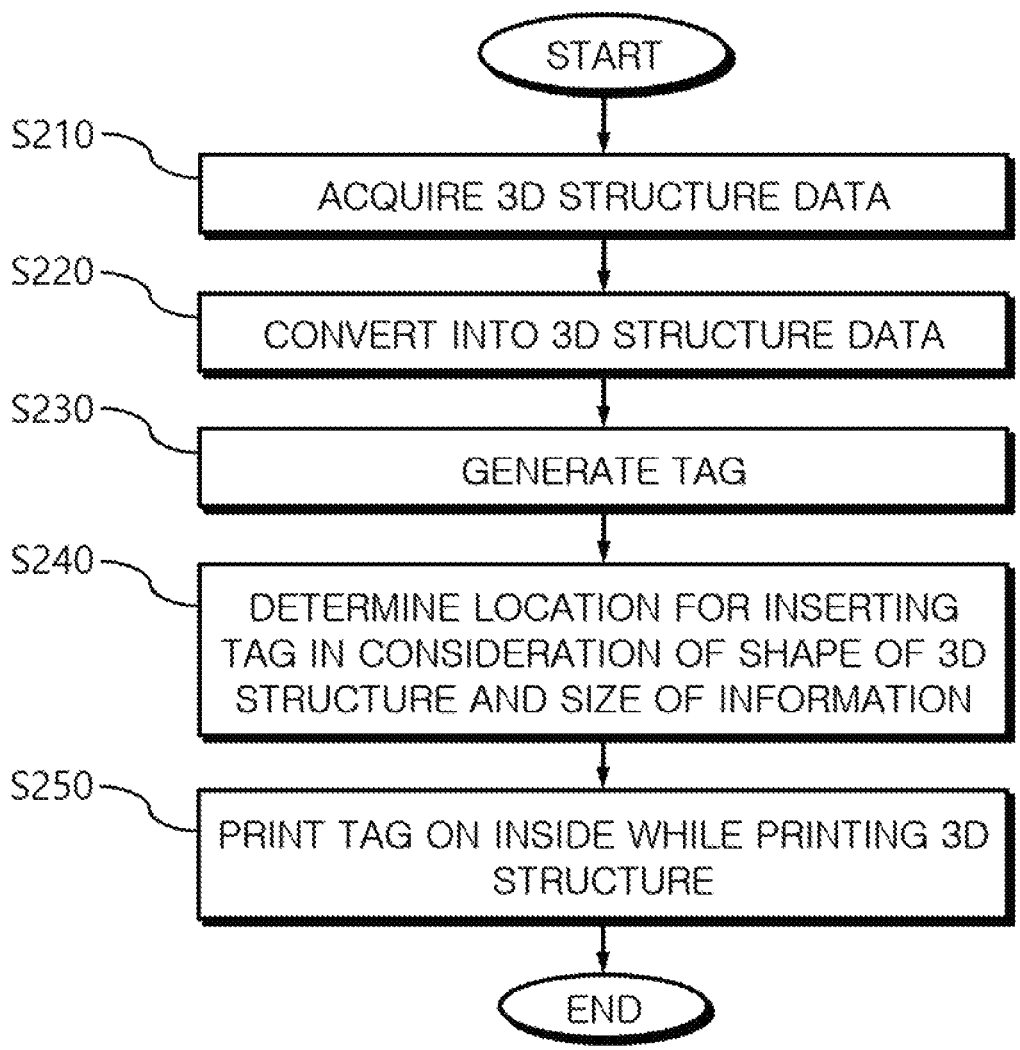
FIG. 3 is a flowchart illustrating a 3D printing method according to another exemplary embodiment of the present invention.

FIG. 3 is a flowchart to illustrate a 3D printing method according to another exemplary embodiment of the present invention.

As shown in FIG. 3, 3D data regarding a 3D structure to be printed is acquired first (S210), and the acquired 3D data is converted into 3D structure data which is used in the 3D printer for 3D printing (S220).

In step S210, the 3D data regarding the 3D structure 100 may be acquired through a storage medium, another device communication connected, or a network.

Next, the tag 150 having information on the 3D structure 100 recorded thereon is generated (S230), and a location for inserting the tag 150 generated in step S230 is determined in consideration of the shape and size of the 3D structure 100 (S240).

For example, in the case of the 3D structure 100 shown in FIG. 2, when it is impossible to insert the tag 150 into a neck portion and it is possible to insert the tag 150 into a head portion, the location for inserting the tag 150 may be determined to be the head portion of the 3D structure 100, specifically, the center of the head portion.

Thereafter, the 3D structure 100 is printed and the tag 150 is printed on the inside of the 3D structure 100 (S250). That is, in the process of printing the 3D structure 100 shown in FIG. 1, the tag 150 is printed on the inside of the 3D structure.

Figure 4:
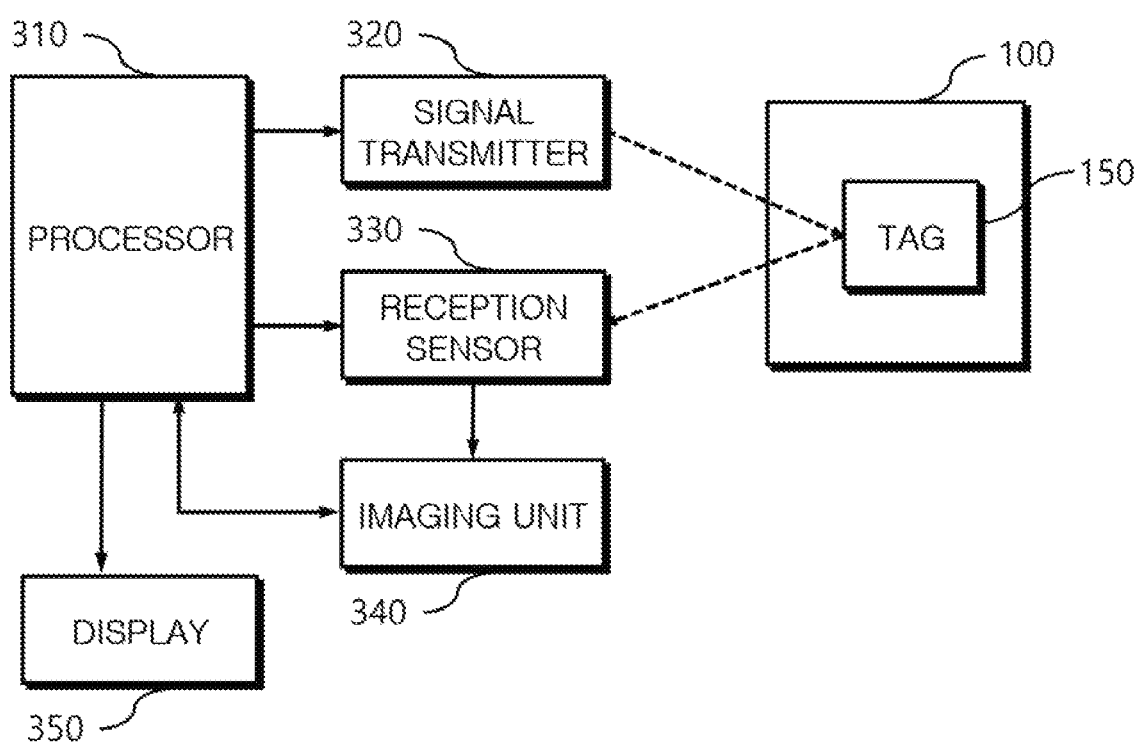
FIG. 4 is a view showing a tag recognition device for recognizing information recorded on a tag printed on the inside of a 3D structure.

FIG. 4 is a view showing a tag recognition device for recognizing information recorded on the tag 150 printed on the inside of the 3D structure 100. For easy explanation and understanding, FIG. 4 illustrates the 3D structure 100 and the tag 150. However, they are illustrated as a concept rather than as being real.

The tag recognition device according to another exemplary embodiment of the present invention may sense the shape of the tag 150 without destroying the 3D structure 100, and extract information recorded on the tag 150 from the sensed shape of the tag 150.

As shown in FIG. 4, the tag recognition device according to an exemplary embodiment of the present invention includes a processor 310, a signal transmitter 320, a reception sensor 330, an imaging unit 340, and a display 350.

The signal transmitter 320 may transmit electromagnetic waves to the 3D structure 100 and the tag 150, and the reception sensor 330 may receive electromagnetic waves reflected from the tag 150. The operation of transmitting by the signal transmitter 320, and the operation of receiving by the reception sensor 330 are controlled by the processor 310.

Figure 5:
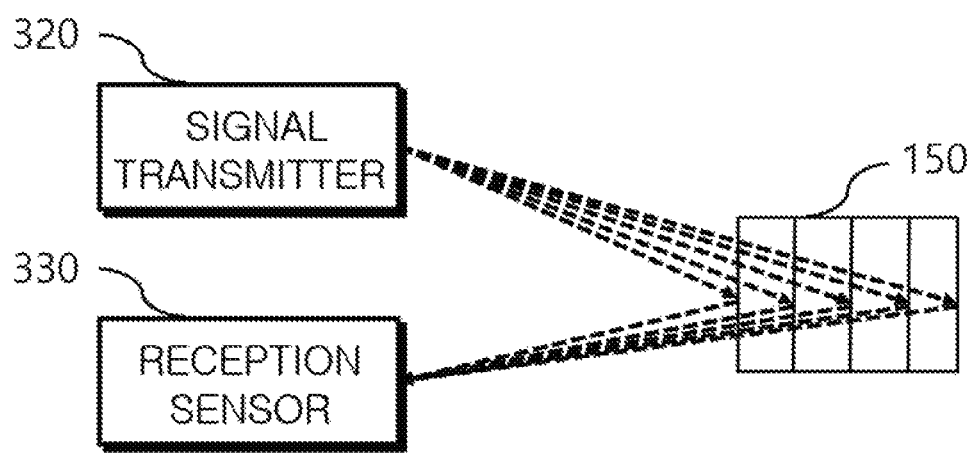
FIG. 5 is a concept view to illustrate a method for recognizing a tag.

As the electromagnetic waves transmitted and received by the signal transmitter 320 and the reception sensor 330, terahertz signals having semi-permeability may be used. Since these signals have different reflection and absorption properties according to a property and a configuration of a material, some signals may be reflected and some signals may pass on a medium change portion as shown in FIG. 5.

Accordingly, it can be understood that tomography is performed on the tag 150 using the signal transmitter 320 and the reception sensor 330. The terahertz signals are merely an example and other electromagnetic waves having semi-permeability may be substituted for the terahertz signals.

The imaging unit 340 may restore the shape of the tag 150 by combining the results of receiving by the reception sensor 330, and divide the restored shape on a pixel basis.

The processor 310 may extract information recorded on the tag 150 by combining the pixel data which has been divided after the shape was restored by the imaging unit 340, and display the extracted information on the display 350.

Since the tag 150 has the information on the 3D structure 100 recorded thereon, the information displayed on the display 350 is the information on the 3D structure 100.

Up to now, the method that prints the 3D structure 100 having the tag 150 inserted thereinto using the 3D printer, recognizes the tag 150 from the printed 3D structure 100 in a non-destructive method and grasps the information recorded on the tag 150 has been described with reference to preferred embodiments.

In the embodiments of the present invention, the 3D structure 100 may be a work, a cultural property, or an ancient document, or may be a normal product or other things. That is, the type of the 3D structure 100 is not limited.

In addition, the shape and type of the tag 150 printed on the inside of the 3D structure 100 is not limited.

In this case, the tag 150 may be recognized by the tag recognition device in all directions. That is, the same result may be obtained when the tag 150 is recognized by the tag recognition device in any direction.

For example, the tag 150 may be implemented by using a spherical bar code. That is, a code having spherical patterns combined with one another may be applied as the tag 150. The tag 150 may be a kind of a tag which has the same 2D cross sections with reference to the center of the tag 150.

Figure 6:
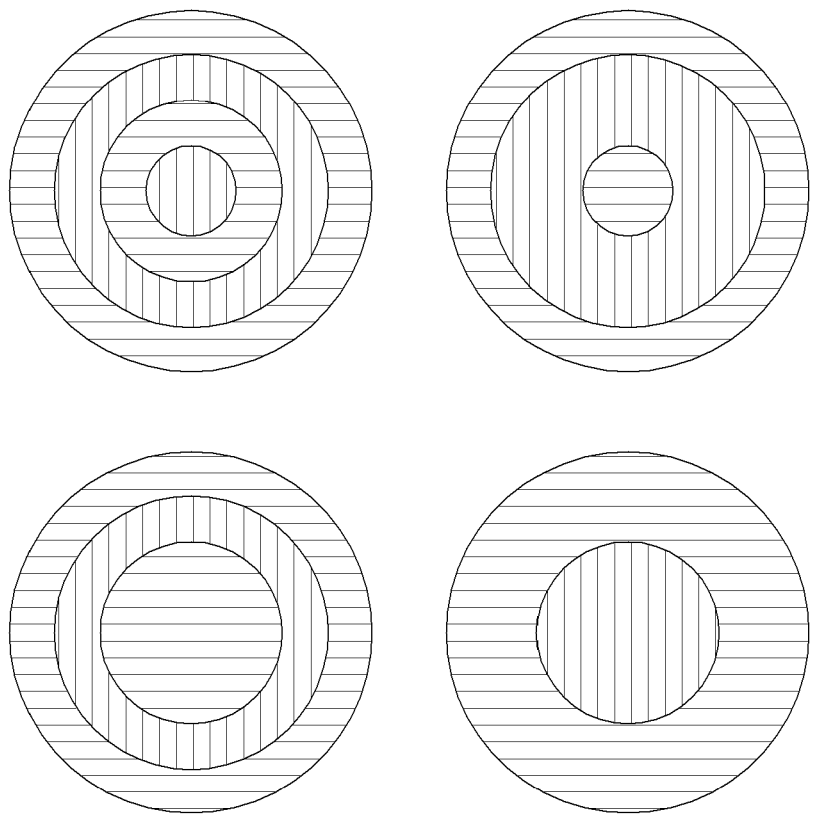
FIGS. 6 and 7 are views showing examples of a tag which is implemented by using a spherical bar code.

FIG. 6 illustrates cross sections of various tags 150. In FIG. 6, portions having horizontal lines may be portions where printing is not performed, and portions having vertical lines may be portions where printing is performed. The four tags 150 illustrated in FIG. 6 may have different information recorded thereon.

Figure 7:
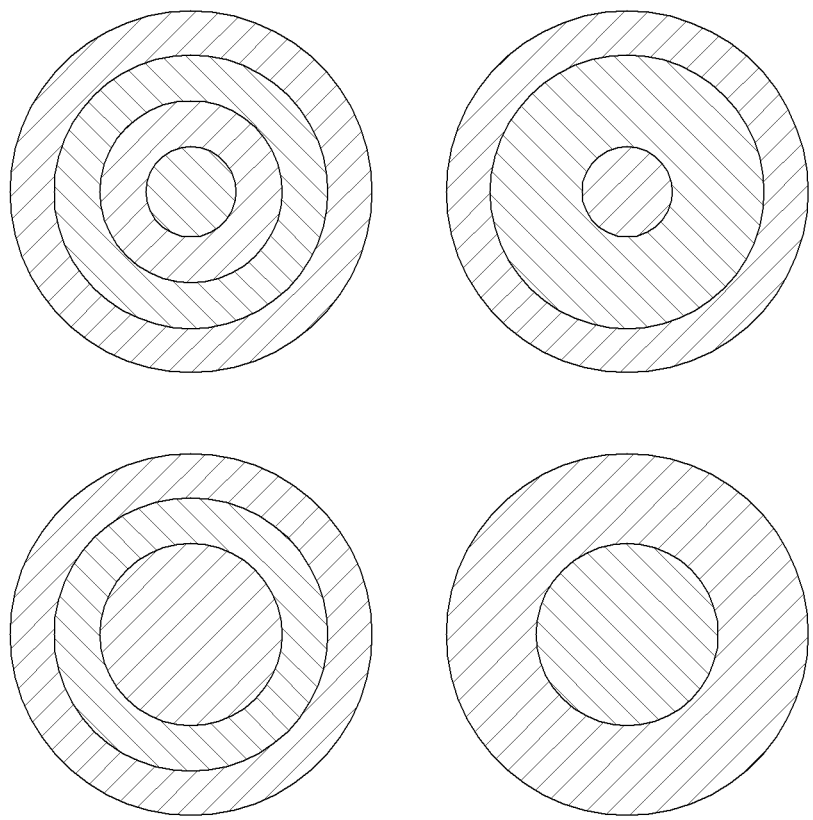

Furthermore, the spherical patterns of the tag 150 may be formed of two materials. For example, the portions having the horizontal lines and the portions having the vertical lines in FIG. 6 may be printed by different materials. The cross sections of the spherical tags 150 generated according to the above-mentioned method are illustrated in FIG. 7. In FIG. 7, the material of the portions hatched by diagonal lines "/" and the material of the portions hatched by diagonal lines "\" are different from each other.

Hereinafter, various other types of tags 150 will be described in detail with reference to FIGS. 8 to 10.

Figure 8:
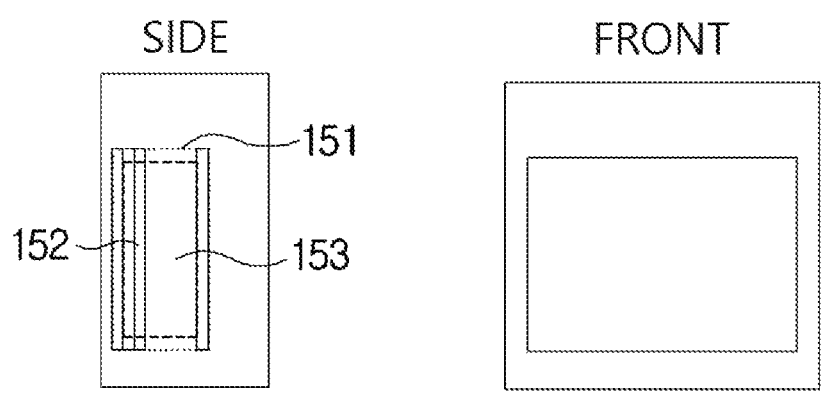
FIGS. 8 to 10 are views showing examples of various types of tags.

FIG. 8 is a view showing an example of a 1D type of a tag. The 1D tag may have information recorded thereon by changing a medium/pattern only in a depth direction (z-axis direction) from the front as shown in FIG. 8.

Figure 9:
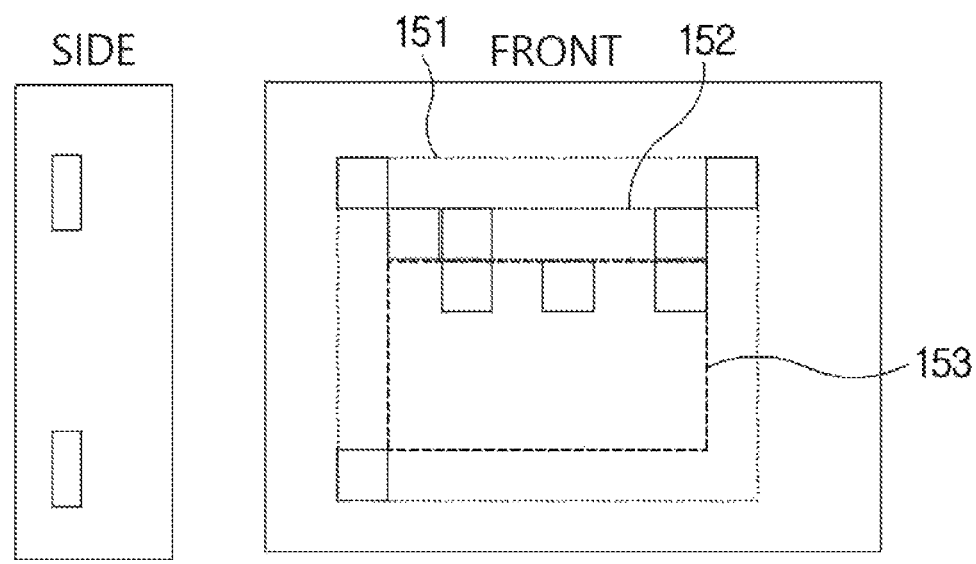

FIG. 9 is a view showing an example of a 2D type of a tag. The 2D tag may have information recorded thereon by changing a medium/pattern only in a horizontal direction (x-axis direction) and a vertical direction (y-axis direction) from the front as shown in FIG. 9.

Figure 10:
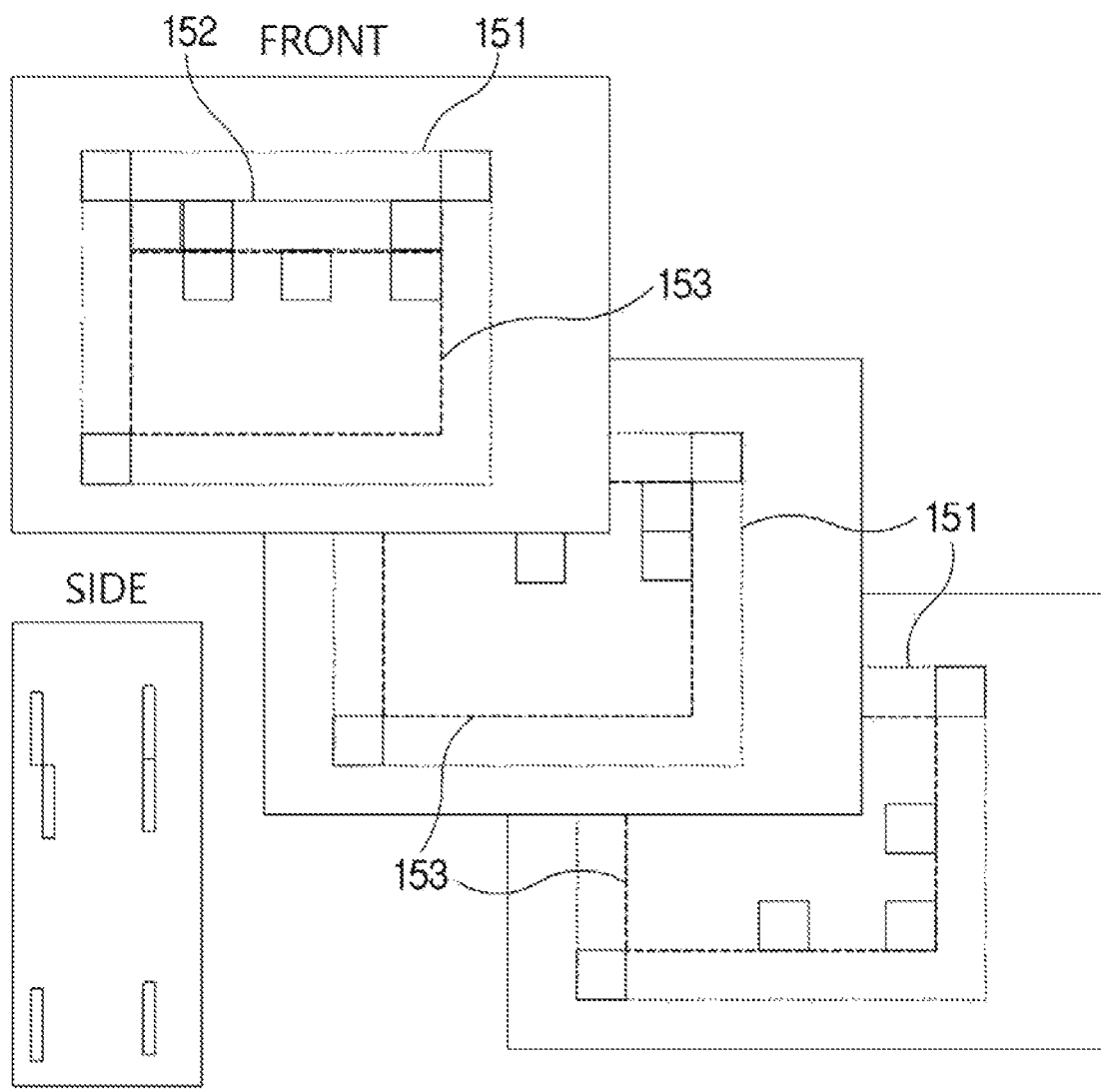

FIG. 10 is a view showing an example of a 3D type of a tag. The 3D tag may have information recorded thereon by changing a medium/pattern in the horizontal direction (x-axis direction), the vertical direction (y-axis direction), and the depth direction (z-axis direction) from the front as shown in FIG. 10. The 3D tag is a type in which the 1D type of the tag is arranged in the 2D type.

As shown in FIGS. 8 to 10, the tag includes a location detection area 151, a metadata area 152, and a data area 153 regardless of the type of the tag.

The location detection area 151 may be used to grasp the location of the tag 150 and may indicate a start point and an end point of the tag 150.

The metadata area 152 is an area where meta information, which is information on the tag (a tag type, a tag length, or the like), is recorded. In the case of the 3D tag, the metadata area 152 is recorded only on the first layer. That is, layers other than the first layer in the 3D tag are not provided with the metadata area 152.

The data area 153 has information on the 3D structure 100 recorded thereon. Herein, the information may include a material, a purpose, a using method, a price, a manufacturer, a manufacturing date, a manufacturing place, copyright information, an original authentication code as described above.

Figure 11:
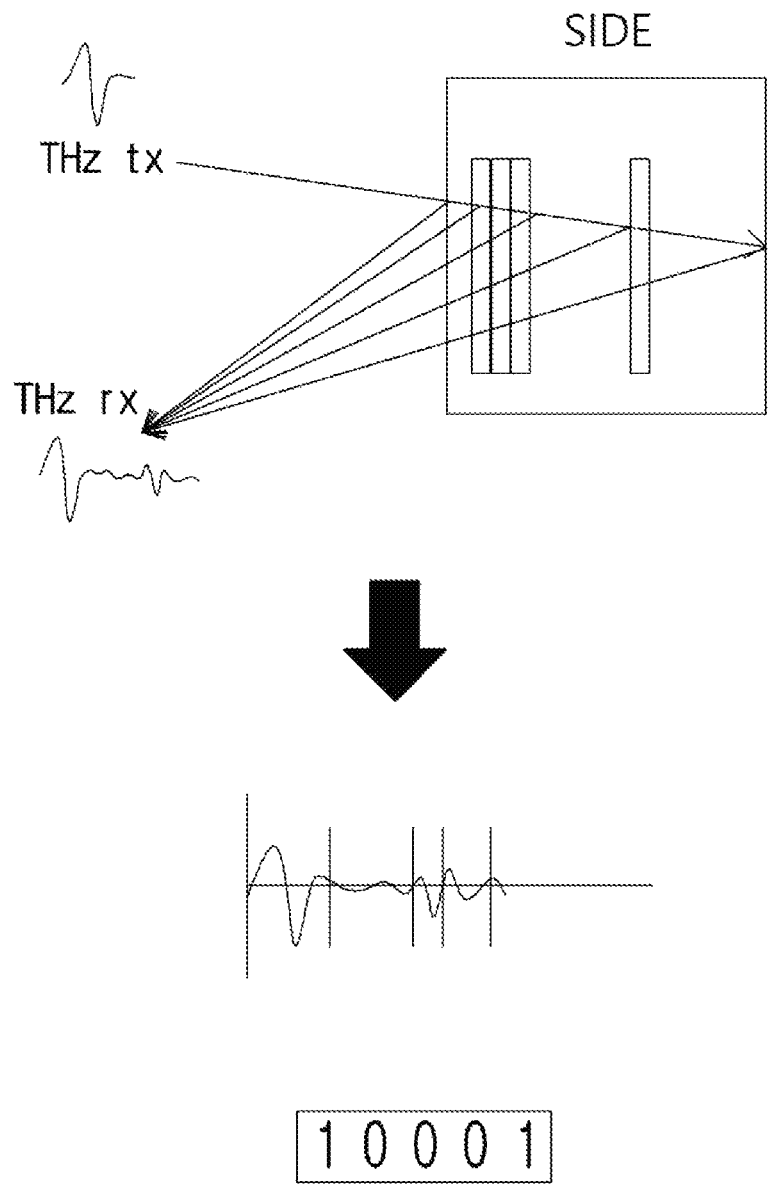
FIGS. 11 to 13 are views to illustrate a method for recognizing various types of tags.

As shown in FIG. 11, in the case of the 1D type of the tag, the recorded information may be grasped by transmitting and receiving terahertz signals only to and from one point.

Figure 12:
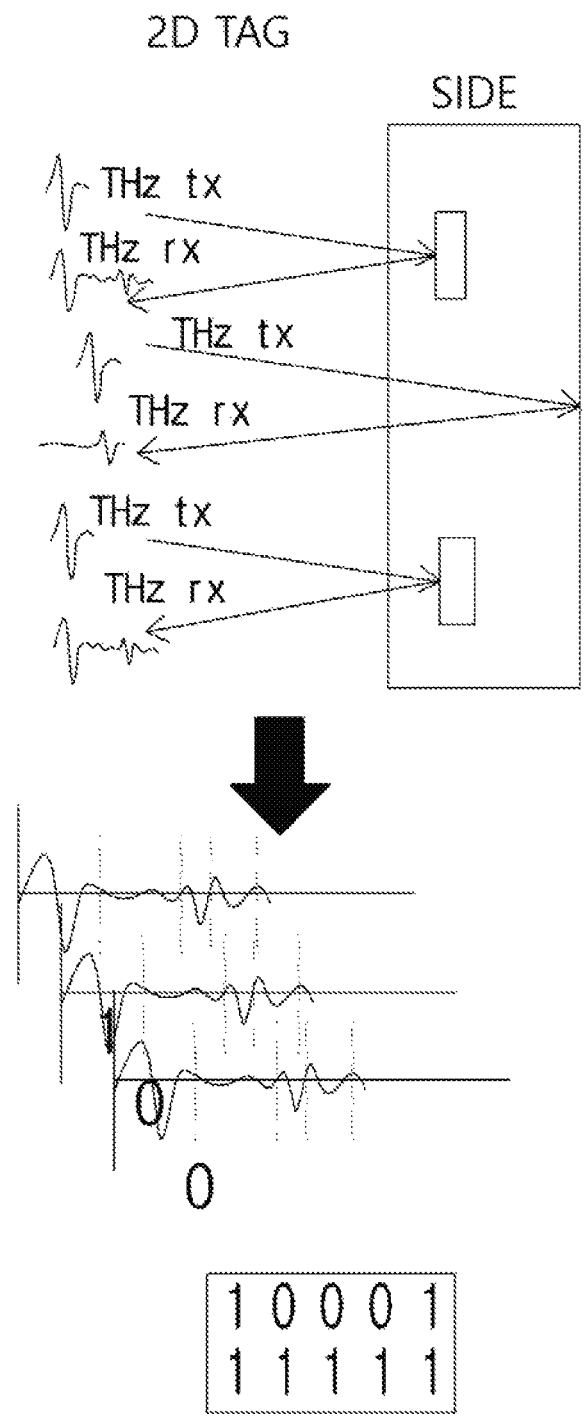
Figure 13:
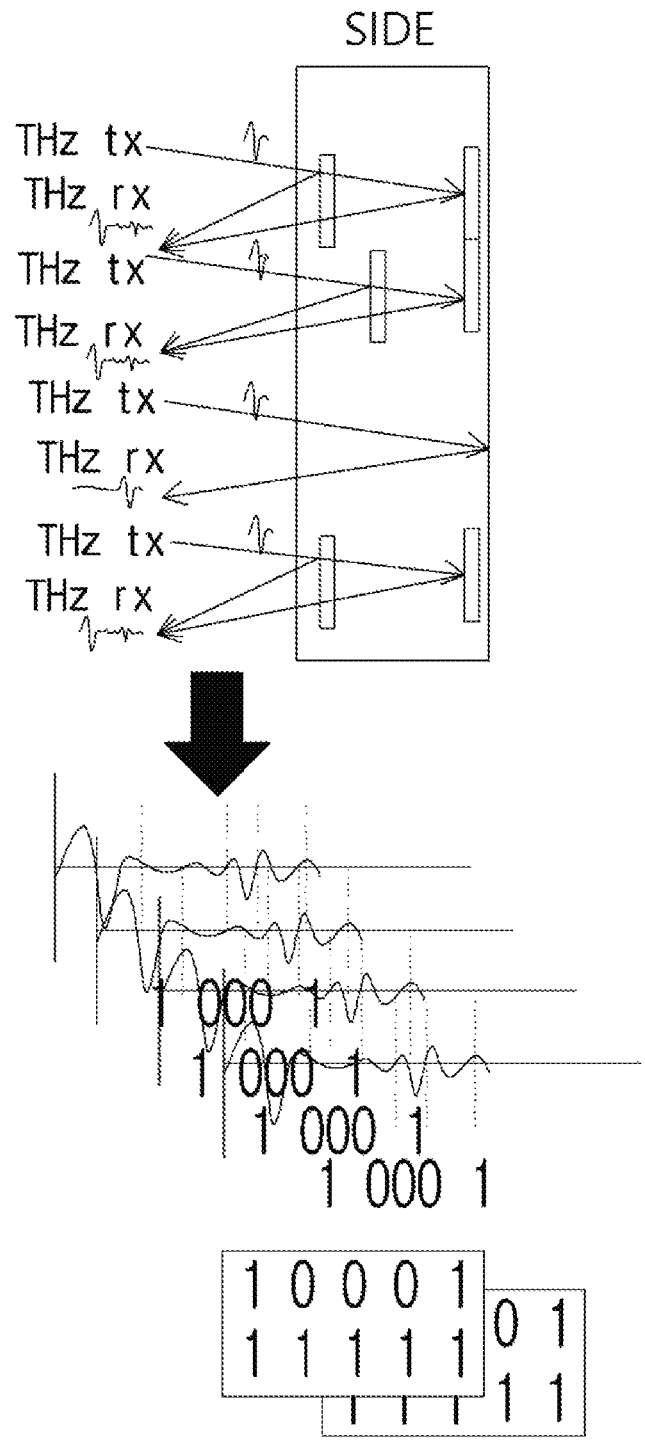

However, in the case of the 2D type of the tag and the 3D type of the tag, terahertz signals should be transmitted and received while scanning the front of the tag in x and y directions as shown in FIGS. 12 and 13. There is a difference in that, in the case of the 2D type of the tag, only a single bit is detected/recognized from one point, whereas, in the case of the 3D type of the tag, a plurality of bits are detected/recognized from one point at time intervals according to a depth.

Figure 14:
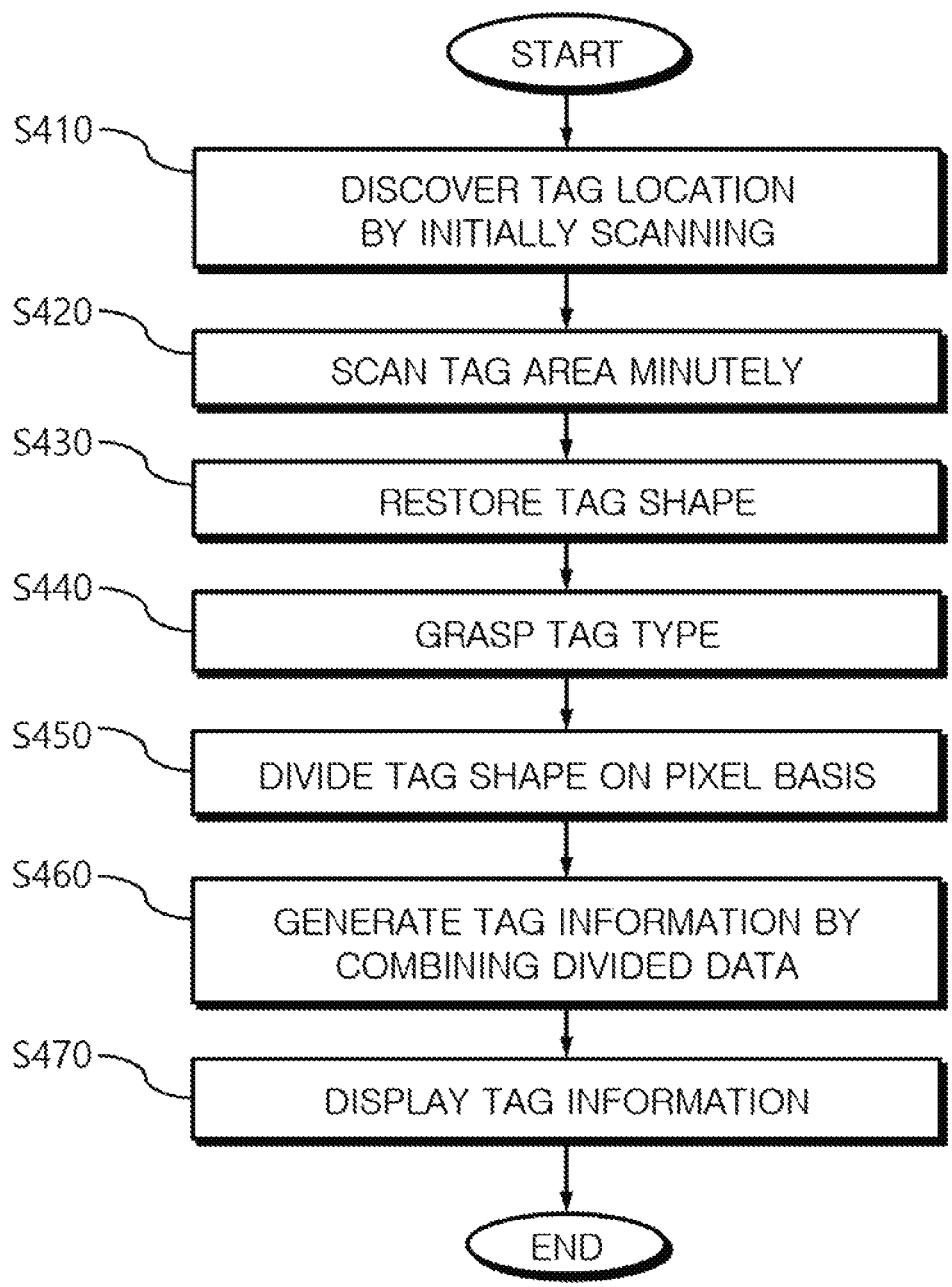
FIG. 14 is a flowchart to illustrate a method for recognizing a tag according to still another exemplary embodiment of the present invention.

Hereinafter, a process of recognizing tags shown in FIGS. 8 to 10 will be described in detail with reference to FIG. 14. FIG. 14 is a view to illustrate an auto tag recognition method according to still another exemplary embodiment of the present invention.

As shown in FIG. 14, the processor 310 of the tag recognition device initially scans the 3D structure 100 using the signal transmitter 320, and discovers an area where the tag 150 is located (S410).

In step S410, the location of the tag 150 may be discovered by detecting/recognizing the location detection area 151.

Next, the processor 310 transmits electromagnetic waves using the signal transmitter 320 while scanning the tag area discovered in step S410 minutely/closely, and, in response to this, the reception sensor 330 receives the electromagnetic waves reflected from the tag 150 (420).

Then, the imaging unit 340 restores the shape of the tag 150 by combining the results of receiving by the reception sensor 330 (S430), and the processor 310 may grasp the type of the tag 150 based on the shape restored in step S430.

Meanwhile, the tag type may be grasped based on the result of the detection/recognition of the location detection area 151. This may be because the location detection area 151 varies according to the tag type. Alternatively, the tag type may be grasped with reference to tag type information recorded on the meta data area 152 of the tag 150.

Next, the imaging unit 340 divides the shape of the tag 150 which is restored in step S430 on a pixel basis (S450), and the processor 310 generates tag information by combining the data divided on the pixel basis in step S450 according to the type grasped in step S440 (S460).

In addition, the processor 310 displays the tag information generated in step S460 on the display 350 (S470). Since the tag 150 has the information on the 3D structure 100 recorded thereon, the information on the 3D structure 100 is displayed in step S470.

While exemplary embodiments have been particularly shown and described above, it will be understood by those of ordinary skill in the art that the present invention is not limited to the above-described exemplary embodiments, and various changes in form and details may be made therein without departing from the spirit and scope of the present invention as defined by the following claims. In addition, various changes should not be interpreted as being separated from the technical idea or scope of the present invention.

The invention claimed is:

1. A three dimensional (3D) printing method comprising:
generating a tag having specific information recorded thereon; and
printing the 3D structure and the tag simultaneously, wherein the tag is buried in the 3D structure,
wherein the tag has same two dimensional (2D) cross sections with reference to a center of the tag, and
wherein the tag comprises a plurality of concentric spheres.

2. The 3D printing method of claim 1, wherein the specific information is information on the 3D structure.

3. The 3D printing method of claim 1, further comprising:
sensing a shape of the tag using electromagnetic waves having semi-permeability without destroying the 3D structure; and
extracting the specific information from the sensed shape of the tag.

4. The 3D printing method of claim 1, further comprising determining a location of the tag based on the shape of the 3D structure.

5. The 3D printing method of claim 1, wherein a material of each sphere of the plurality of concentric spheres is selected from a first material or a second material.

6. A three dimensional (3D) printer structure comprising:
a 3D structure which is produced by a 3D printer; and
a tag buried in the 3D structure, wherein the tag is produced by the 3D printer and has specific information recorded thereon,
wherein the tag has same two-dimensional (2D) cross sections with reference to a center of the tag, and
wherein the tag comprises a plurality of concentric spheres.

* * * * *